Patented Oct. 31, 1944

2,361,538

UNITED STATES PATENT OFFICE 2,361,538

STABILIZATION OF VINYL COMPOUNDS

Raymond A. Franz, Springfield, Pa., assignor to The United Gas Improvement Company, a corporation of Pennsylvania No Drawing. Application November 22, 1939, Serial No. 305,678

11 Claims. (Cl. 260—666.5)

This invention relates generally to the stabilization of aromatic olefines.

More particularly, this invention relates to a novel process and material for the stabilization of aromatic olefines and mixtures containing the same, including light oil fractions, against oxidation and polymerization.

It is well known that aromatic olefines, and mixtures including light oil fractions containing the same, have a tendency to oxidize and/or polymerize with resultant formation of undesirable products.

For example, oxidation and/or polymerization often results in the production of gums, resins and other products which discolor a hydrocarbon liquid and otherwise contaminate such materials.

Furthermore, the oxidation and/or polymerization of such unsaturated hydrocarbons frequently results in substantial losses of these materials, a factor of importance where it is desired to subsequently utilize them in an unsaturated state. For example, many aromatic olefines are highly desirable in their unsaturated state for the production of numerous products such as synthetic resins. Due, however, to the decided tendency of many aromatic olefines of which styrene, methyl styrene and indene are examples, to oxidize and/or polymerize, the separation and purification of these unsaturated hydrocarbons without substantial oxidation and/or polymerization from hydrocarbon mixtures such as light oil fractions, presents a difficult problem.

Moreover, the storage and transportation of aromatic olefines and mixtures containing the same are rendered difficult due to the aforementioned tendency of the such unsaturated hydrocarbons to oxidize and/or polymerize.

Purification of aromatic olefines and hydrocarbon mixtures containing such unsaturates by such prior art processes as fractional distillation and the like is extremely difficult because of the tendency of the unsaturated hydrocarbons to polymerize and form gums and resins particularly under the influence of heat.

I have found that an aromatic olefine or a mixture containing one or more unsaturated hydrocarbons may be expeditiously stabilized against oxidation and/or polymerization by adding thereto relatively small quantities of a mixture of a basic material, either organic or inorganic, and a phenolic material selected from a group consisting of p-tertiary butyl catechol, 2,4-diaminophenol dihydrochloride, 2-amino-5-hydroxy toluene, p-benzylaminophenol, alpha-naphthol, p-methylaminophenol sulfate, pyrogallol, hydroquinone, alpha-nitroso-beta-naphthol, dibenzyl-p-aminophenol, 1,5-dihydroxynaphthalene, catechol, p-aminophenol, p-dimethylaminophenol sulfate, and diamyl phenol.

When one or more basic materials, either organic or inorganic, is mixed with one or more selected phenolic materials, there is obtained a product which has been found particularly effective in stabilizing aromatic olefines and their mixtures against oxidation and/or polymerization.

Particularly outstanding phenolic materials are p-benzylaminophenol, para-tertiary - butylcatechol, and 2-amino-5-hydroxytoluene.

The term "basic material" is intended to embrace both inorganic and organic bases.

Exemplary of inorganic bases may be mentioned potassium hydroxide, sodium hydroxide, ammonium hydroxide, calcium hydroxide and barium hydroxide.

Exemplary of organic bases may be mentioned primary, secondary and tertiary amines of the aliphatic, aromatic and mixed aliphatic-aromatic type. Other organic bases include nitrogen heterocyclic compounds and substituted nitrogen heterocyclic compounds in which the element nitrogen forms at least one of the elements found in the ring structure.

Illustrative of the organic bases may be mentioned specifically, for example, normal-butyl-amine, diphenylamine, dimethylaniline, benzyldimethylamine, pyridine, methylpyridine, pyrrole, methylpyrrole and benzenediazonium hydroxides.

Other basic materials which may be used in mixtures with selected phenolic materials as stabilizing agents for aromatic olefines and mixtures containing them include mixed bases such as the substituted ammonium hydroxides. For example, dimethylbenzylammonium hydroxide may be mentioned as one specific compound of this class.

Generally speaking, the basic material and the selected phenolic material are mixed in the proportions of between 0.5 and 2.0 equivalent parts of the basic material to 1.0 equivalent part of selected phenolic material. This ratio gives a very effective stabilizing agent although mixtures containing other ratios of basic and selected phenolic material have also been found suitable as stabilizing agents.

Various procedures may be utilized for preparing the stabilizing material. Choice of the procedure to be employed will be guided to some extent by such factors as the properties of the ingredients which make up the stabilizing composition, the manner in which the hydrocarbon mixture containing the stabilizing material is to be utilized, and the like.

For example, when the selected phenolic material and the basic material are both soluble in the aromatic olefine or in its mixture, a convenient method for preparing the stabilizing material comprises adding the desired quantity of each ingredient directly to the hydrocarbon material or its mixture being treated.

Another convenient procedure for the preparation of the stabilizing material comprises adding the ingredients to a relatively small sample of the aromatic olefine or its mixture to form a concentrated solution. The concentrated solution may then serve as a stock from which desired amounts may be taken for stabilizing relatively large quantities of aromatic olefine or mixtures thereof.

If desired, the stabilizing material may be prepared by adding the ingredients to an inert hydrocarbon solvent such as, for example, benzene, toluene, xylene, solvent naphtha or various fractions of petroleum hydrocarbons. This applies particularly in the case of light oil fractions containing resin-forming aromatic olefines and obtained from tar and other condensates produced in the manufacture of artificial gas such as carburetted water gas, oil gas, coal gas and the like.

When either the basic material or the selected phenolic material is insoluble or only slightly soluble in an aromatic olefine, or its mixture, the stabilizing material may be conveniently prepared by adding the ingredients to an alcohol. The concentrated alcoholic solution may then be added to the unstable hydrocarbon or its mixture being treated.

Other procedures for the preparation of the stabilizing material will occur to those skilled in the art from the herein contained disclosure.

The quantity of stabilizing material which is preferably utilized to bring about effective stabilization will, of course, depend upon the nature of the unsaturated hydrocarbon or its mixture undergoing treatment and upon the results desired. Generally, it may be said that amounts varying from .001% to 5.0% by weight of unsaturated hydrocarbon may be used with very desirable results. Usually, 0.05% to 0.5% by weight will be found entirely satisfactory.

The stabilizing materials herein described are particularly useful in the separation and concentration of aromatic olefines from light oil produced in the manufacture of artificial gas, such as carburetted water gas, oil gas, coal gas, etc. Among such aromatic olefines are those of the resin-forming type such as styrene, methyl styrene and indene.

Generally in practice the separation of unsaturated hydrocarbons from a hydrocarbon mixture of this character, and the concentration of the individual unsaturated hydrocarbons is effected by fractional distillation. Such procedures normally result in considerable polymerization of the unsaturated hydrocarbons due at least in part to the temperatures involved, causing losses of the desired unsaturates, and making necessary frequent stopping of the distillation for the purpose of cleaning out the distillation apparatus.

Of the resin-forming unsaturated hydrocarbons occurring in light oil, the aromatic olefines, styrene, methyl styrene, and indene are particularly susceptible to polymerization during their separation and concentration by distillation. This is in part due to the presence of other materials of apparent similar boiling point making necessary extended distillation procedure. In any event, these fractions are rarely concentrated beyond 80% with ordinary distillation technique, and special measures must be taken to avoid large losses in the form of polymer formed in the still pot.

By the addition of the herein described stabilizing material to the still charge, polymerization is materially reduced and may be, for the most part, prevented. The quantity of polymer formed is generally negligible or greatly reduced thus resulting in a higher yield of desired unsaturates, and a more efficient distillation procedure.

Likewise by the addition of my new stabilizing material to an unsaturated hydrocarbon or a mixture containing one or more unsaturated hydrocarbons undergoing storage or transportation or other treatment, or otherwise, polymerization is likewise materially reduced or prevented.

Illustrative of the herein described process and material for the stabilization of aromatic olefines and mixtures containing them, the following examples are given.

*Example I*

One hundred thirty-five parts by weight of a hydrocarbon fraction obtained by distillation from light oil obtained in the manufacture of oil gas and containing 61% by weight of paramethyl styrene was heated for 2 days at 100° C. in a sealed bomb containing an atmosphere of commercial nitrogen. Nitrogen was used to insure comparative results in an atmosphere free of laboratory fumes. After the heating period, the bomb was cooled, opened and the contents evaporated in tared glass dishes in a vacuum oven. The dried polymer thus obtained was then weighed and the percentage yield by weight calculated. There was obtained a yield of polymer of 11.2% by weight of unsaturated hydrocarbon, no stabilizing material having been added.

*Example II*

To another portion of 135 parts by weight of the same fraction of para-methylstyrene as used in Example I, there was added 0.1% by weight of para-tertiary-butylcatechol and .002% by weight of dibenzylamine. The mixture was then treated in the same manner as described in Example I. The resultant polymer thus obtained amounted to a yield of 2.85 by weight of unsaturated hydrocarbon, thus representing a decrease of 74.5% over the yield of polymer obtained in Example I where no stabilizing mixture was employed.

This example shows a very definite improvement over the use of para-tertiary-butylcatechol alone which under similar circumstances yielded polymer to the extent of 5.45% by weight of unsaturated hydrocarbon.

*Example III*

To 135 parts by weight of the same fraction of para-methylstyrene as was used in Example I, 0.1% by weight of para-tertiary-butylcatechol and 0.001% by weight of mono-normal-butylamine was added. The mixture was then treated as described in Example I. The yield of polymer obtained in this case was 2.42 by weight, representing a decrease of 78.3% of the blank run in Example I.

Example IV

To 54 parts by weight of the same fraction of para-methylstyrene as was used in Example I, 0.1% by weight of 2-amino-5-hydroxytoluene and 0.31 parts by weight of a 40% pentasol solution of trimethylbenzylammonium hydroxide was added to effect stabilization. The mixture was heated for 2 days at 80° C. in the same manner as set forth in Example I. The polymer obtained in this example amounted to 0.80% by weight of unsaturated hydrocarbon, representing a decrease of 77.1% over a blank run in which no stabilizing agent was employed.

Example V

In this example, there was added to 45 parts by weight of the same fraction of para-methylstyrene as was used in Example I, 0.1% by weight of 2-amino-5-hydroxytoluene and 0.31 parts by weight of a 40% pentasol solution of trimethylbenzylammonium hydroxide. The mixture was then heated for 2 days at 100° C. The yield of polymer obtained in this case was 6.30% representing a decrease of 56.1% over a blank run in which no stabilizing agent was employed.

Comparison of the yield of polymer in this example and in Example IV indicates the effect of increased temperature upon polymer formation.

Example VI

Illustrating the stabilizing effect of the herein described stabilizing materials upon a hydrocarbon mixture containing styrene, two portions of a 34% solution of styrene obtained by fractionation from light oil were heated for 2 hours at 130° C., one with and one without a stabilizing agent. The stabilizing agent employed for the one portion of the styrene solution comprised 0.1% of para-tertiary-butylcatechol and 0.044% of normal butylamine. The stabilized portion of the styrene solution, after heating, gave 0.18% by weight of a polymer whereas the portion to which no stabilizing agent had been added yielded 5.0% by weight of a polymer after similar treatment. It is thus shown that the addition of a stabilizing mixture comprising para-tertiary-butylcatechol and normal-butylamine resulted in a decrease of 96.4% in yield of undesired polymer.

Example VII

In this example, two portions of a 58% fraction of styrene obtained by the fractionation of light oil were heated for 15 minutes at 130° C. with and without a stabilizing agent. The stabilizing agent employed comprised 0.1% by weight of para-tertiary-butylcatechol and 0.044% of normal-butylamine. The unstabilized styrene portion yielded a polymer equivalent to 0.86% by weight of the charged solution, while the stabilized styrene solution yielded a polymer equal to only 0.03% by weight of the original charge. By the addition of a stabilizing agent, there was thus obtained a decrease of 96.5% over a similar run without stabilizing agent.

Example VIII

To an 800 pound charge of a light oil fraction containing aromatic olefines predominantly composed of methylstyrenes, there was added 0.1% by weight of para-tertiary-butylcatechol and 0.088% by weight of normal-butylamine. The charge was heated during a 47 hour period of distillation at temperatures up to 100° C. The polymer formed under these conditions amounted to 0.2% by weight of the original charge. Under similar conditions when no stabilizing agent was used, the amount of polymer obtained amounted to 17% by weight of the initial charge.

Example IX

A light oil indene fraction containing 85.0% indene was heated at a temperature of 100° C. in the absence of air for a period of 24 hours. A quantity of indene equivalent to 1.0% of the total indene present was converted to a polymer by this procedure.

A second portion of the original sample was mixed with 0.5% by weight of a mixture of alpha-naphthol and n-butylamine (1:1 molar proportions) and heated at 100° C. in the absence of air for 24 hours. Only 0.2% of the total indene present was converted to a polymer.

The above illustrative examples indicate the effectiveness of a stabilizing mixture comprising one or more basic materials and one or more selected phenolic materials upon various aromatic olefines and upon mixtures containing one or more aromatic olefines.

The herein described process and stabilizing material are particularly effective for the stabilization of such unsaturated hydrocarbons as the aromatic olefines.

Exemplary of such aromatic olefines may be mentioned styrene and substituted styrenes such as, for example, para-methylstyrene, alpha-methyl styrene, alpha-methyl-para-ethyl styrene, and indene.

The term "light oil" as used herein includes not only distillate from the tar formed in artificial gas production but also any condensates from the gas. Thus light oil may contain resin-forming unsaturated hydrocarbons such as indene, methyl styrene (ortho, meta, para), styrene, cyclopentadiene, dicyclopentadiene, isoprene, piperylene, butadiene, isobutylene, etc. The term also embraces fractions or cuts of light oil.

While specific procedures and specific compositions for the stabilization of aromatic olefines and mixtures containing them have been particularly described, it will be understood that this is by way of illustration. Therefore, changes, omissions, additions, substitutions, and/or modifications may be made within the scope of the claims without departing from the spirit of the invention.

I claim:

1. A process for stabilizing resin-forming material containing aromatic olefine material as a major portion thereof which comprises adding thereto a stabilizing proportion of stabilizing material having at least two components which are simultaneously present in the resulting mixture, one of said components being a base and another of said components being phenolic material selected from the group consisting of p-tertiary butyl catechol, 2,4-diamino phenol dihydrochloride, 2-amino-5-hydroxy toluene, p-benzyl amino phenol, alpha-naphthol, p-methyl amino phenol sulfate, pyrogallol, hydroquinone, alpha-nitroso-beta-naphthol, dibenzyl-p-amino phenol, 1,5-dihydroxynaphthalene, catechol, p-amino phenol, p-dimethyl amino phenol sulfate, and diamyl phenol.

2. A process for stabilizing resin-forming material containing styrene as a major portion thereof which comprises adding thereto a stabilizing proportion of stabilizing material having at least two components which are simultaneously present in the resulting mixture, one of said components being a base and another of said components being phenolic material selected from the group consisting of p-tertiary butyl catechol, 2,4-diamino phenol dihydrochloride, 2-amino-5-hydroxy toluene, p-benzyl amino phenol, alpha-naphthol, p-methyl amino phenol sulfate, pyrogallol, hydroquinone, alpha-nitroso-beta-naphthol, dibenzyl-p-amino phenol, 1,5-dihydroxynaphthalene, catechol, p-amino phenol, p-dimethyl amino phenol sulfate, and diamyl phenol.

3. A process for stabilizing resin-forming material containing methyl styrene as a major portion thereof which comprises adding thereto a stabilizing proportion of stabilizing material having at least two components which are simultaneously present in the resulting mixture, one of said components being a base and another of said components being phenolic material selected from the group consisting of p-tertiary butyl catechol, 2,4-diamino phenol dihydrochloride, 2-amino-5-hydroxy toluene, p-benzyl amino phenol, alpha-naphthol, p-methyl amino phenol sulfate, pyrogallol, hydroquinone, alpha-nitroso-beta-naphthol, dibenzyl-p-amino phenol, 1,5-dihydroxynaphthalene, catechol, p-amino phenol, p-dimethyl amino phenol sulfate, and diamyl phenol.

4. A process for stabilizing resin-forming material containing indene as a major portion thereof which comprises adding thereto a stabilizing proportion of stabilizing material having at least two components which are simultaneously present in the resulting mixture, one of said components being a base and another of said components being phenolic material selected from the group consisting of p-tertiary butyl catechol, 2,4-diamino phenol dihydrochloride, 2-amino-5-hydroxy toluene, p-benzyl amino phenol, alpha-naphthol, p-methyl amino phenol sulfate, pyrogallol, hydroquinone, alpha-nitroso-beta-naphthol, dibenzyl-p-amino phenol, 1,5-dihydroxynaphthalene, catechol, p-amino phenol, p-dimethyl amino phenol sulfate, and diamyl phenol.

5. A process for stabilizing resin-forming material containing aromatic olefine material as a major portion thereof which comprises adding thereto a stabilizing proportion of a stabilizing material having at least two components which are simultaneously present in the resulting mixture, one of said components being an organic base and another of said components being phenolic material selected from the group consisting of p-tertiary butyl catechol, 2,4-diamino phenol dihydrochloride, 2-amino-5-hydroxy toluene, p-benzyl amino phenol, alpha-naphthol, p-methyl amino phenol sulfate, pyrogallol, hydroquinone, alpha-nitroso-beta-naphthol, dibenzyl-p-amino phenol, 1,5-dihydroxynaphthalene, catechol, p-amino phenol, p-dimethyl amino phenol sulfate, and diamyl phenol.

6. A process for stabilizing resin-forming material containing aromatic olefine material as a major portion thereof which comprises adding thereto a stabilizing proportion of stabilizing material having at least two components which are simultaneously present in the resulting mixture, one of said components being an amine base and another of said components being phenolic material selected from the group consisting of p-tertiary butyl catechol, 2,4-diamino phenol dihydrochloride, 2-amino-5-hydroxy toluene, p-benzyl amino phenol, alpha-naphthol, p-methyl amino phenol sulfate, pyrogallol, hydroquinone, alpha-nitroso-beta-naphthol, dibenzyl-p-amino phenol, 1,5-dihydroxynaphthalene, catechol, p-amino phenol, p-dimethyl amino phenol sulfate, and diamyl phenol.

7. A process for stabilizing resin-forming material containing aromatic olefine material as a substantial portion thereof under conditions including prolonged heating at elevated temperature which comprises adding thereto a stabilizing proportion of stabilizing material having at least two components, one of said components being a base and another of said components being a phenolic material selected from the group consisting of p-tertiary butyl catechol, 2,4-diamino phenol dihydrochloride, 2-amino-5-hydroxy toluene, p-benzyl amino phenol, alpha-naphthol, p-methyl amino phenol sulfate, pyrogallol, hydroquinone, alpha-nitroso-beta-naphthol, dibenzyl-p-amino phenol, 1,5-dihydroxynaphthalene, catechol, p-amino phenol, p-dimethyl amino phenol sulfate, and diamyl phenol.

8. A process for stabilizing resin-forming material containing aromatic olefine material as a major portion thereof, which comprises adding stabilizing material thereto having at least two components which are simultaneously present in the resulting mixture, one of said components being a base and another of said components being phenolic material selected from the group consisting of p-tertiary butyl catechol, 2,4-diamino phenol dihydrochloride, 2-amino-5-hydroxy toluene, p-benzyl amino phenol, alpha-naphthol, p-methyl amino phenol sulfate, pyrogallol, hydroquinone, alpha-nitroso-beta-naphthol, dibenzyl-p-amino phenol, 1,5-dihydroxynaphthalene, catechol, p-amino phenol, p-dimethyl amino phenol sulfate, and diamyl phenol, said stabilizing material being added in amount from .001% to 5.0% by weight of unsaturated hydrocarbon material present, and said stabilizing material being comprised of between 0.5 and 2.0 equivalent parts of said base to 1.0 equivalent parts of said selected phenolic material.

9. A process for stabilizing resin-forming material containing aromatic olefine material as a major portion thereof, which comprises adding thereto a stabilizing proportion of stabilizing material having at least two components which are simultaneously present in the resulting mixture, one of said components being a base and another of said components being p-tertiary butyl catechol.

10. A process for stabilizing resin-forming material containing aromatic olefine material as a major portion thereof, which comprises adding thereto a stabilizing proportion of stabilizing material having at least two components which are simultaneously present in the resulting mixture, one of said components being a base and another of said components being p-benzyl amino phenol.

11. A process for stabilizing resin-forming material containing aromatic olefine material as a major portion thereof, which comprises adding thereto a stabilizing proportion of stabilizing material having at least two components which are simultaneously present in the resulting mixture, one of said components being a base and another of said components being 2-amino-5-hydroxy toluene.

RAYMOND A. FRANZ.